United States Patent [19]
Siebert et al.

[11] Patent Number: 5,169,244
[45] Date of Patent: Dec. 8, 1992

[54] RELEASABLE SPLIT BEARING

[75] Inventors: Craig Siebert, Ossining, N.Y.; Martin Scott, Brewster, Mass.

[73] Assignee: Metallized Carbon Corporation, Ossining, N.Y.

[21] Appl. No.: 831,696

[22] Filed: Feb. 5, 1992

[51] Int. Cl.$^5$ .................. F16C 33/08; F16C 35/02
[52] U.S. Cl. .................. 384/276; 384/281; 384/439
[58] Field of Search .................. 384/428–444, 384/276, 281, 537

[56] References Cited

U.S. PATENT DOCUMENTS

| | | | |
|---|---|---|---|
| 2,992,049 | 7/1961 | Siebert et al. | 384/442 |
| 3,808,661 | 5/1974 | Carlsson | 384/439 |
| 3,954,311 | 5/1976 | Dike | 384/439 |
| 4,854,747 | 8/1989 | Siebert et al. | 384/434 X |
| 5,013,166 | 5/1991 | Domer | 384/281 X |
| 5,080,501 | 1/1992 | Siebert | 384/537 |

Primary Examiner—Thomas R. Hannon
Attorney, Agent, or Firm—Jordan B. Bierman

[57] ABSTRACT

A bearing assembly having a hanger with an opening therethrough, a substantially cylindrical shell with bearing material extending radially inwardly thereof, the cylindrical shell fitting within the opening, outwardly extending peripheral flanges on the semi-cylindrical shell and flanges extending radially inwardly into the opening from the perimeter. One set of flanges is male and the other set being female and extends only partly around the periphery of the shell to form an unflanged peripheral space. The other set of flanges extends only partly around the perimeter to form an unflanged perimeter portion of the opening. The perimeter portion is at least equal in length to the flange on said semi-cylindrical shell and the peripheral space is at least equal in length to the flange on said perimeter. The male and female flange are complementary to each other, and the latter is adapted to receive former upon rotation of the semi-cylindrical shell in said opening.

20 Claims, 2 Drawing Sheets

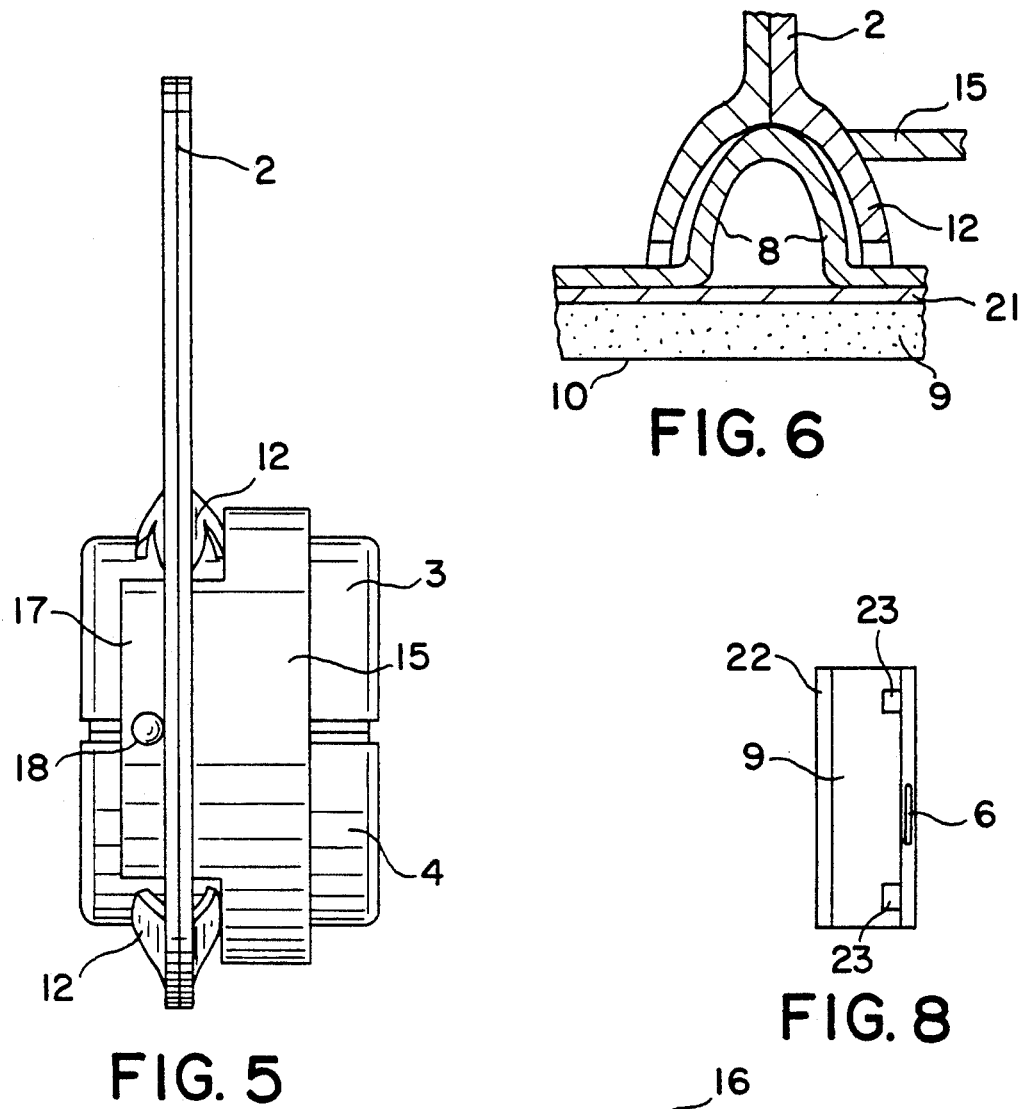
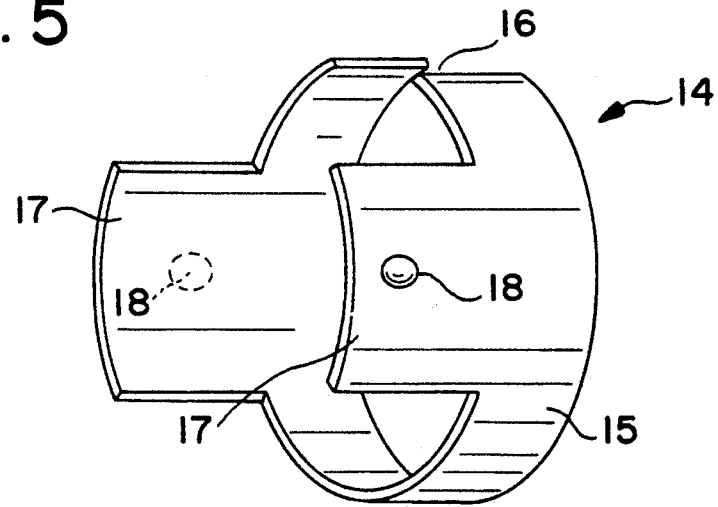

RELEASABLE SPLIT BEARING

The present invention is directed to an improved hanger bearing assembly, more specifically one which can be firmly held in place and readily dismounted.

BACKGROUND OF THE INVENTION

The assembly of the present invention is particularly useful in connection with certain forms of drying ovens, although it is also useful in many other areas. Such drying ovens are usually of the tunnel type and the articles to be dried (often plywood sheets) are passed therethrough on rollers. Each roller requires a minimum of two bearings and, due to the high temperatures employed, these bearings must be able to withstand such temperatures for substantial periods of time without failing. Since these ovens are quite long (some exceed 300 feet), there are a large number of transverse rollers and, consequently, at least double that number of bearings supporting them.

Should any substantial number of bearings fail, the plywood sheets could no longer be moved through the oven and the entire operation comes to a complete halt. Obviously, this is extremely serious and the economic losses are substantial.

When this happens, it is imperative that the necessary bearing replacement take place as quickly as possible. Usually, substantially all of the bearings are replaced at the same time, in order to prevent a subsequent failure shortly after the bearings have been changed and to thereby minimize down time.

Due to the high temperatures referred to above, it is necessary to allow the oven to cool down to a point at which workmen can handle the bearings. In order to minimize this time, the crew used to effect the change wears asbestos gloves and other similar protective clothing. This enables them to get started on the job while the equipment is still fairly hot.

DESCRIPTION OF THE PRESENT INVENTION

Therefore, it is among the objects of the present invention to provide an assembly wherein the bearing can be quickly and firmly connected to the shroud which, in turn, is attached to the frame of the device. It is also among the objects of the present invention to provide such an assembly wherein the bearing can be easily and quickly dismounted.

The present invention is a bearing assembly comprising a hanger having a opening therethrough. The bearing itself is a cylindrical shell having the bearing material therein; the actual bearing surface being at its radially most inward level.

In its cylindrical form, the shell is appropriately sized so that it fits into the opening in the hanger. It is also provided with at least one flange on its periphery extending radially outwardly therefrom. A complementary flange extends radially inwardly from the periphery of the opening. One of these two parts carries a male flange and the other a female flange. The latter is adapted to receive the former upon insertion of the shell into the opening and rotation thereof.

The flanges extend only partly around the perimeter of the opening and the periphery of the shell so that there are portions of the periphery and the perimeter which carry no flange whatsoever. The unflanged portion of the opening is at least as long as the flange on the cylindrical shell and the unflanged peripheral space on the cylindrical shell is at least equal in length to the flange on the perimeter of the opening. As a result, there is sufficient room to allow the flanges to enter between one another and be circumferentially aligned for rotation of the male flange into the complementary female flange.

In a preferred form of the device, the shell is divided into two parts at points diametrically opposite each other. A hinge is located at one point and a latch at the other. In this form of the invention, the latch advantageously comprises a slot in one half of the shell adjacent the unhinged split point and a tongue on the other half of the shell adjacent the same point. The halves are moved with the aid of the hinge to the closed position in which the slot and tongue are abutting each other. The tongue passes through the slot and, since it is of bendable material, can be bent back so that it can no longer slip out. This securely holds the shell and bearing material in the closed cylindrical position.

In another preferred form of the invention, there are two flanges provided on each of the perimeter of the opening and periphery of the shell, thereby forming two peripheral gaps on the shell and two circumferential spaces on the periphery of the opening.

For additional security, there can be added to the foregoing device a lock for axially retaining the shell within the opening and properly mounted on the hanger. The lock advantageously comprises a substantially cylindrical rim having a gap therein and at least two axially directed projections extending only partly around the circumference of the rim. The unflanged portion of the opening in the hanger is at least equal in length to the projections, so that they can extend therethrough.

The lock is of resilient material and the projections, when the lock is in its relaxed state, are somewhat farther apart than the diameter of the opening. The rim may then be compressed so that the distance between the projections becomes smaller than the diameter of the opening, thus permitting insertion thereof. When the projections extend through the opening, the lock can be released so that it springs apart and bears against the perimeter of the opening in the hanger. This securely holds the bearing axially place.

A preferred form of this embodiment carries at least one protuberance on each of the projections. These are located so that, when the projections are inserted into the opening, the protuberances are on the side of the hanger away from the rim. These protuberances act together with the perimeter of the opening in order to assist in preventing the bearing from accidentally or unintentionally being axially removed from the hanger.

BRIEF DESCRIPTION OF THE DRAWINGS

In the accompanying drawings, constituting a part hereof, and in which like reference characters indicate like parts.

FIG. 5 is an edge view taken from the left side of FIG. 1;

FIG. 6 is a cross section along line 6—6 of FIG. 1;

FIG. 7 is a perspective view of the lock; and

FIG. 8 is an end view of an open face of the bearing.

DETAILED DESCRIPTION OF THE INVENTION

Figure 3:
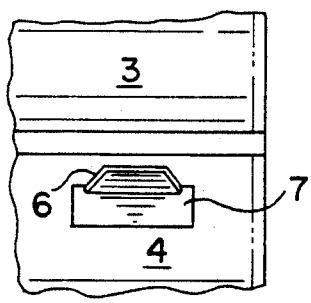
FIG. 3 is an edge view showing the two halves of the split bearing and the latch holding them together.
Figure 4:
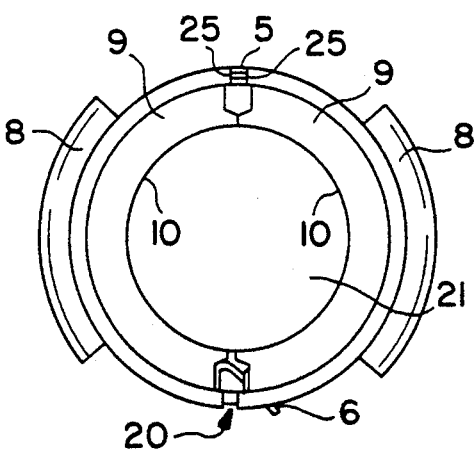
FIG. 4 is a view similar to that of FIG. 2 without the shaft and with the bearing in its closed position.

Bearing assembly 1 comprises hanger 2 and bearing 19. Holes 13 are provided on hanger 2 for mounting the bearing at any desired location. Bearing 19 comprises semi-cylindrical shell 3 and complementary semi-cylindrical shell 4. Bearing material 9 is on the inner surfaces of shells 3 and 4 and is provided with bearing surfaces 10. In a preferred form, bearing material 9 is housed in bearing holder 24. Shells 3 and 4 and bearing material 9 are split and connected by hinge 5, thus permitting shells 3 and 4 to move toward and away from each other. Diametrically opposite from hinge 5 is latch 20 composed of slot 7 and tongue 6. The latter is inserted into slot 7 and bent upwardly as shown in FIG. 3, thereby securely and releasably latching shells 3 and 4 together in their closed, cylindrical position and forming hole 21 for receipt of shaft 11. This position is best shown in FIG. 4.

Hanger 2 is provided with a opening therethrough into which bearing 19 fits. Hanger 2 also carries female flanges 12 which project partially into the opening and shells 3 and 4 are provided with male flanges 8. Both female flanges 12 and male flanges 8 extend only partially around the perimeter of the opening and the circumferences of shells 3 and 4, respectively.

As shown in FIG. 7, lock 14 comprises rim 15 and projections 17. Gap 16 is provided at one point in rim 15 to permit lock 14, which is shown in its relaxed state in FIG. 7, to be compressed. Projections 17 extend axially from rim 15 and are suitably sized so that they can pass through the unflanged portions of the perimeter of the opening hanger 2. Projections 17 also carry protuberances 18 which assist in holding the assembly together. These are best shown in FIG. 5.

In a preferred form of the invention, mating faces 22 of bearing material 9 are substantially planar. Recessed portions 25 are provided to enable hinge 5 to close without fracturing bearing material 9. Planar mating faces 22, as compared to previously known irregular mating surfaces, permit easier installation of bearing material 9 as well as replacement of one semi-cylindrical half of bearing material 9 while retaining the other half. Tabs 23 secure bearing material 9 on holder 24. It is also advantageous if the length of semi-cylindrical bearing material 9 is slightly less than the axial length of half shell 3 or 4. This, coupled with tabs 23, makes the manufacture and installation of bearing material 9 much easier as the axial dimension is no longer critical and tabs 23 secure material 9 in place even if the axial dimensions are different.

Figure 2:
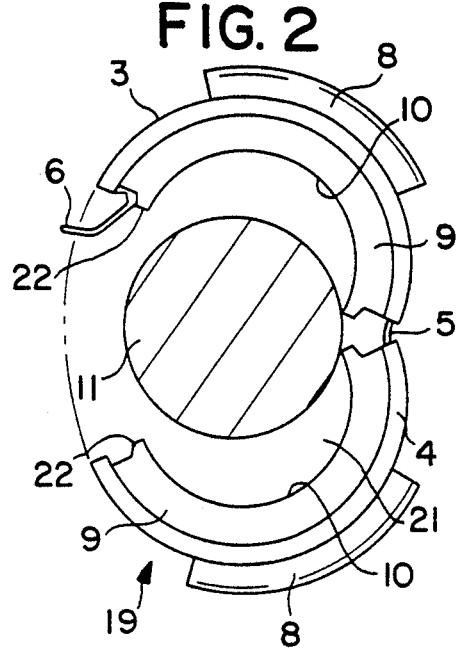
FIG. 2 is an axial view of the bearing in its open position showing a shaft located therein.

To install the bearing of the present invention, bearing 19, in its open position as shown in FIG. 2, is placed adjacent shaft 11. Shells 3 and 4 are then caused to rotate about hinge 5 and are pressed closed as shown in FIG. 4. Tongue 6 passes through slot 7 and is bent upwardly (see FIG. 3) to lock bearing 19 in its closed position. Bearing 19 is turned so that male flanges 8 are located at the circumferential spaces between female flanges 12 on hanger 2.

Figure 1:
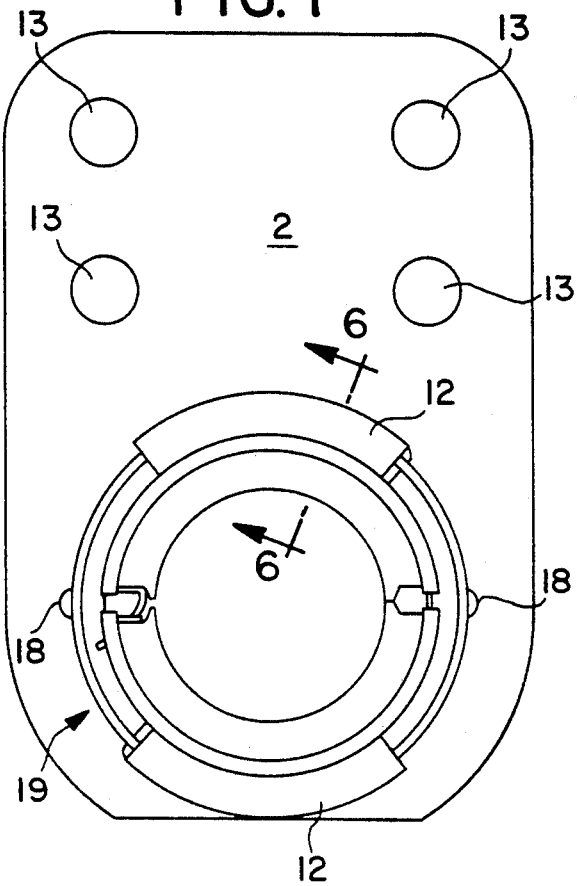
FIG. 1 is an axial view of the bearing assembly.

Bearing 19 is then moved axially into the opening until male flanges 8 are aligned with female flanges 12. Bearing 19 is then rotated about its axis so that male flanges 8 enter female flanges 12 and are fully contained therein. This is shown in FIG. 1 and in section in FIG. 6.

Thereafter, projections 17 on rim 15 of lock 14 are also placed circumferentially between female flanges 12 and lock 14 is axially inserted into the opening in hanger 2 until projections 17 assume the position shown in FIG. 5. Protuberances 18 are located on the side of hanger 2 away from rim 15. Lock 14 is then released and, due to its resilience, springs apart and bears against the perimeter of the opening in hanger 2. This acts as a further lock and retains the bearing axially in place.

To remove the bearing, the foregoing steps are simply reversed. Rim 15 of lock 14 is compressed (gap 16 permits this) and is withdrawn axially from hanger 2. Thereafter, bearing 19 is rotated so that male flanges 8 are circumferentially between female flanges 12. This permits bearing 19 to be withdrawn axially from hanger 2. Thereafter, if it is desired to replace bearing material 9, bearing 19 is opened by bending tongue 6 downward as shown in FIG. 3 and withdrawing tongue 6 from slot 7.

While only a limited number of specific embodiments of the present invention have been expressed disclosed, it is, nonetheless, to be broadly construed, and not to be limited except by the character of the claims appended hereto.

What we claim is:

1. A bearing assembly comprising a hanger having an opening therethrough, said opening having a diameter and a perimeter, a substantially cylindrical shell having a periphery, an axis extending through said cylindrical shell, bearing material on said cylindrical shell extending radially inwardly thereof and forming a bearing surface, said cylindrical shell fitting within said opening, said cylindrical shell comprises a pair of substantially semi-cylindrical shells each having complementary semi-cylindrical bearing material thereon, each said bearing material having substantially planar bearing faces abutting substantially planar faces of another said bearing material, said bearing material secured in said semi-cylindrical shells by at least one tab bearing against said bearing material.

2. A bearing assembly comprising a hanger having an opening therethrough, said opening having a diameter and a perimeter, a substantially cylindrical shell having a periphery, an axis extending through said cylindrical shell, bearing material on said cylindrical shell extending radially inwardly thereof and forming a bearing surface, said cylindrical shell fitting within said opening, a pair of substantially semi-cylindrical shells having a hinge for motion in a direction perpendicular to said axis between a closed position wherein said semi-cylindrical shells form a cylinder and an open position wherein parts of said semi-cylindrical shells approximately diametrically opposite said hinge are spaced apart, a latch releasably securing said shells in said closed position, said semi-cylindrical shells fitting within said opening when in said closed position, each said semi-cylindrical shell has a semi-cylindrical bearing material thereon, each said bearing material having substantially planar faces adjacent another said bearing material.

3. The bearing assembly of claim 2 wherein said bearing material is secured in said cylindrical shell by at least one tab bearing against said bearing material.

4. A bearing assembly comprising a hanger having an opening therethrough, said opening having a diameter and a perimeter, a substantially cylindrical shell having a periphery, an axis extending through said cylindrical shell, bearing material on said cylindrical shell extending radially inwardly thereof and forming a bearing surface, said cylindrical shell fitting within said opening, at least one peripheral male flange extending radially outwardly from said cylindrical shell or extending radially inwardly into said opening from said perimeter, at least one peripheral female flange extending radially outwardly from said cylindrical shell or extending radially inwardly into said opening from said perimeter, said male flange or said female flange being on said cylindrical shell and the other of said male flange or said female flange being on said perimeter, said one of said male flange and female flange extending only partly around said periphery to form at least one peripheral space without either said male flange or female flange, the other of said male flange and female flange extending only partly around said perimeter, thereby forming at least one perimeter portion of said opening without either said male flange or female flange, said perimeter portion being at least equal in length to the flange on said cylindrical shell, said peripheral space being at least equal in length to the flange on said perimeter, said male flange and said female flange being complementary to each other, said female flange being adapted to receive said male flange upon rotation of said cylindrical shell in said opening.

5. The bearing assembly of claim 4 wherein said cylindrical shell comprises a pair of substantially semi-cylindrical shells having a hinge for motion in a direction perpendicular to said axis between a closed position wherein said semi-cylindrical shells form a cylinder and an open position wherein parts of said semi-cylindrical shells approximately diametrically opposite said hinge are spaced apart, a latch releasably securing said shells in said closed position, said semi-cylindrical shells fitting within said opening when in said closed position.

6. The bearing assembly of claim 5 further comprising a lock for axially retaining said shell in said hanger, said lock comprising a substantially cylindrical rim having a circumference with a gap therein, and at least two axially directed projections extending only partly around said circumference, said perimeter portion being at least equal in length to one of said projections.

7. The bearing assembly of claim 6 wherein said lock has a relaxed state, in which said projections have a distance therebetween larger than said opening diameter, and a compressed state, in which said distance is less than said opening diameter, whereby said projections can be inserted into said opening in said compressed state and will bear against said perimeter when released.

8. The bearing assembly of claim 5 wherein each said semi-cylindrical shell has a semi-cylindrical bearing material thereon, each said bearing material having substantially planar faces adjacent another said bearing material.

9. The bearing assembly of claim 8 wherein said bearing material is secured in said semi-cylindrical shell by at least one tab bearing against said bearing material.

10. The bearing assembly of claim 9 wherein said bearing material is axially shorter than said axis.

11. The bearing assembly of claim 8 wherein said planar faces are formed by sawing.

12. The bearing assembly of claim 5 wherein said latch comprises a slot in one of said semi-cylindrical shells adjacent said parts, a bendable tongue on another of said semi-cylindrical shells adjacent said parts, said tongue adapted to enter said slot when said semi-cylindrical shells are in said closed position, there being two male flanges, two peripheral gaps, two female flanges, and two perimeter portions, a lock for axially retaining said shell in said hanger, said lock comprising a substantially cylindrical rim having a circumference with a gap therein, and at least two axially directed projections extending only partly around said circumference, said perimeter portion being at least equal in length to one of said projections, said lock having a relaxed state, in which said projections have a distance therebetween larger than said opening diameter, and a compressed state, in which said distance is smaller than said opening diameter, whereby said projections can be inserted into said opening in said compressed state as will bear against said perimeter when released, said projections having radially outwardly extending protuberances thereon.

13. The bearing assembly of claim 5 wherein said latch comprises a slot in one of said semi-cylindrical shells adjacent said parts, a tongue on another of said semi-cylindrical shells adjacent said parts, said tongue adapted to enter said slot when said semi-cylindrical shells are in said closed position.

14. The bearing assembly of claim 13 wherein said tongue is bendable.

15. The bearing assembly of claim 4 wherein there are two male flanges, two peripheral spaces, two female flanges, and two perimeter portions.

16. The bearing assembly of claim 4 further comprising a lock for axially retaining said shell in said shroud, said lock comprising a substantially cylindrical rim having a circumference with a gap therein, and at least two axially directed projections extending only partly around said circumference, said perimeter portion being at least equal in length to one of said projections.

17. The bearing assembly of claim 16 wherein said lock has a relaxed state, in which said projections have a distance therebetween larger than said opening diameter, and a compressed state, in which said distance is less than said opening diameter, whereby said projections can be inserted into said opening in said compressed state and will bear against said perimeter when released.

18. The bearing assembly of claim 17 wherein radially outwardly extending protuberances are provided on said projections.

19. The bearing assembly of claim 4 wherein said bearing material is secured in said cylindrical shell by at least one tab bearing against said bearing material.

20. The bearing assembly of claim 12 wherein said bearing material is axially shorter than said axis.

* * * * *